US006816542B1

(12) United States Patent
Komatsu (10) Patent No.: US 6,816,542 B1
(45) Date of Patent: Nov. 9, 2004

(54) DIRECT SEQUENCE CDMA RECEIVER HAVING A DELAY PROFILE PRODUCER WITH AN INTERPOLATION FUNCTION

(75) Inventor: Masahiro Komatsu, Tokyo (JP)

(73) Assignee: NEC Corporation (JP)

( * ) Notice: Subject to any disclaimer, the term of this patent is extended or adjusted under 35 U.S.C. 154(b) by 658 days.

(21) Appl. No.: 09/607,018

(22) Filed: Jun. 29, 2000

(30) Foreign Application Priority Data

Jun. 30, 1999 (JP) .......................................... 11-184557

(51) Int. Cl.⁷ ............................. H04B 1/69; H04B 1/713
(52) U.S. Cl. ....................... 375/148; 375/150; 375/152; 370/335
(58) Field of Search ................................. 375/147, 148, 375/150, 152, 136; 370/319, 320, 335, 342, 441, 341

(56) References Cited

U.S. PATENT DOCUMENTS

| 5,982,763 A | * | 11/1999 | Sato .......................... 370/342 |
| 5,999,560 A | * | 12/1999 | Ono .......................... 375/148 |
| 6,275,521 B1 | * | 8/2001 | Uno .......................... 375/150 |
| 6,370,184 B1 | * | 4/2002 | Hellberg ..................... 375/150 |
| 6,507,605 B1 | * | 1/2003 | Fukumoto et al. ........... 375/152 |
| 6,567,482 B1 | * | 5/2003 | Popovic' .................... 375/343 |

FOREIGN PATENT DOCUMENTS

| EP | 0 654 677 | 11/1994 |
| EP | 0 820 156 | 7/1997 |
| JP | 5-7130 | 1/1993 |
| JP | 758669 | 3/1995 |
| JP | 9298491 | 11/1997 |
| JP | 10-32523 | 2/1998 |
| JP | 10178386 | 6/1998 |
| JP | 10271034 | 9/1998 |
| JP | 10285079 | 10/1998 |
| JP | 10336072 | 12/1998 |
| JP | 11-41141 | 2/1999 |
| JP | 2000-244367 | 9/2000 |

OTHER PUBLICATIONS

Japanese Office Action dated Feb. 19, 2002 (w/English translation of relevant portions).
European Search Report dated Nov. 19, 2002.

* cited by examiner

Primary Examiner—Emmanuel Bayard
Assistant Examiner—Qutub Ghulamali
(74) Attorney, Agent, or Firm—Dickstein, Shapiro, Morin & Oshinsky, LLP (57) ABSTRACT

A direct sequence CDMA receiver is disclosed that includes an interpolative delay profile production unit. An A/D converter receives signals that have been received by an antenna and converted to a baseband signal and samples the signals at twice the chip rate. A matched filter finds correlation values with the received data using a spreading code of 1/−1, and the delay profile production means interpolates these correlation values by means of, for example, a filter. A timing detector selects delay profiles in descending order of size, and extracts the timings of each. A despreader interpolates the spreading code to synchronize with the timing signals, and using these interpolated values carries out despreading of the received data. A mixer carries out RAKE/diversity mixing of the despread signals.

8 Claims, 8 Drawing Sheets

DIRECT SEQUENCE CDMA RECEIVER HAVING A DELAY PROFILE PRODUCER WITH AN INTERPOLATION FUNCTION

BACKGROUND OF THE INVENTION

1. Field of the Invention

The present invention relates to a direct sequence CDMA receiver, and more particularly to a receiver of the CDMA (Code Division Multiple Access) system that performs despreading demodulation using a spreading code that is contained in the received signal.

2. Description of the Related Art

CDMA is a method of transmitting by spreading information data into a broadband signal by means of a spreading code having a spread rate (=number of chips/symbols) pg. On the receiving side, the leading position of the spreading code contained within the received signal must be detected and despreading demodulation must be performed using the spreading code that is synchronized with this leading position.

To achieve synchronization on the receiving side, correlation values with the spreading code are found using a portion having a known data sequence, such as pilot symbols or a preamble data sequence that is periodically inserted, and timings are found for which these correlation values are high.

Figure 1:
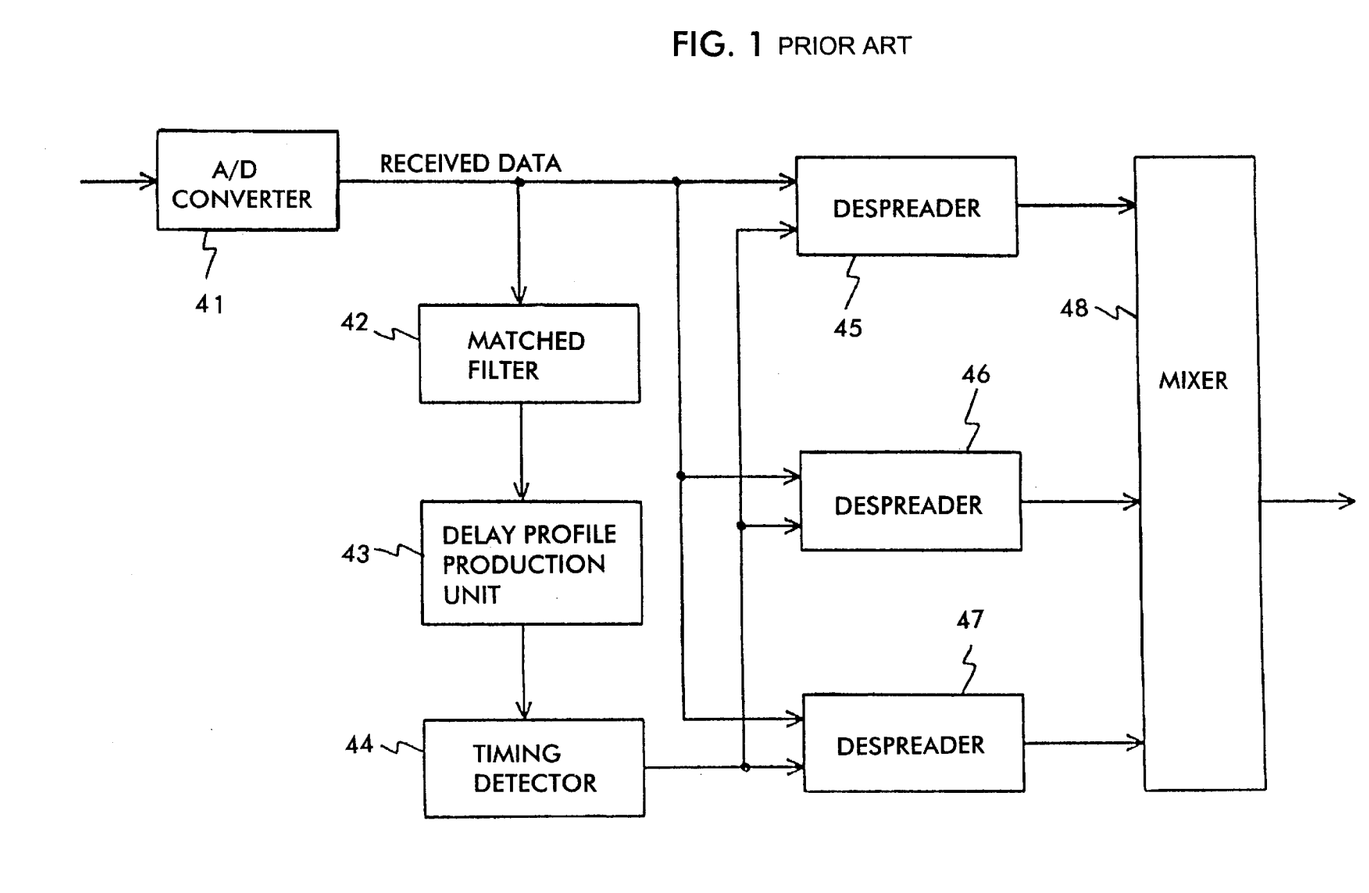
FIG. 1 is a block diagram showing the configuration of an example of a CDMA receiver of the prior art.

FIG. 1 shows the configuration of a receiver. In the receiver in FIG. 1, a signal received by an antenna (not shown) is demodulated to convert to a baseband signal, and which is sampled at twice the chip rate by A/D (analog/digital) converter 41. Correlation values between the spreading code and the sampled received data are then found by matched filter 42.

In delay profile production unit 43, delay profiles are sought from the correlation values of the sampling interval of received data obtained by matched filter 42. In timing detector 44, prescribed locations are selected in descending order from the largest value among the correlation values of this delay profile, and timing signals are generated based on the timings of each of the selected values. Then, in despreader 45–47, the received data are despread using a spreading code that is synchronized with these timing signals, and data are obtained through RAKE/diversity mixing at mixer 48.

Figure 2A:
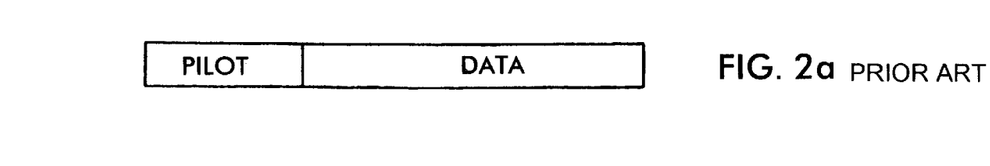
FIG. 2a shows the composition of received signal for use in a receiver of the prior-art example.
Figure 2B:
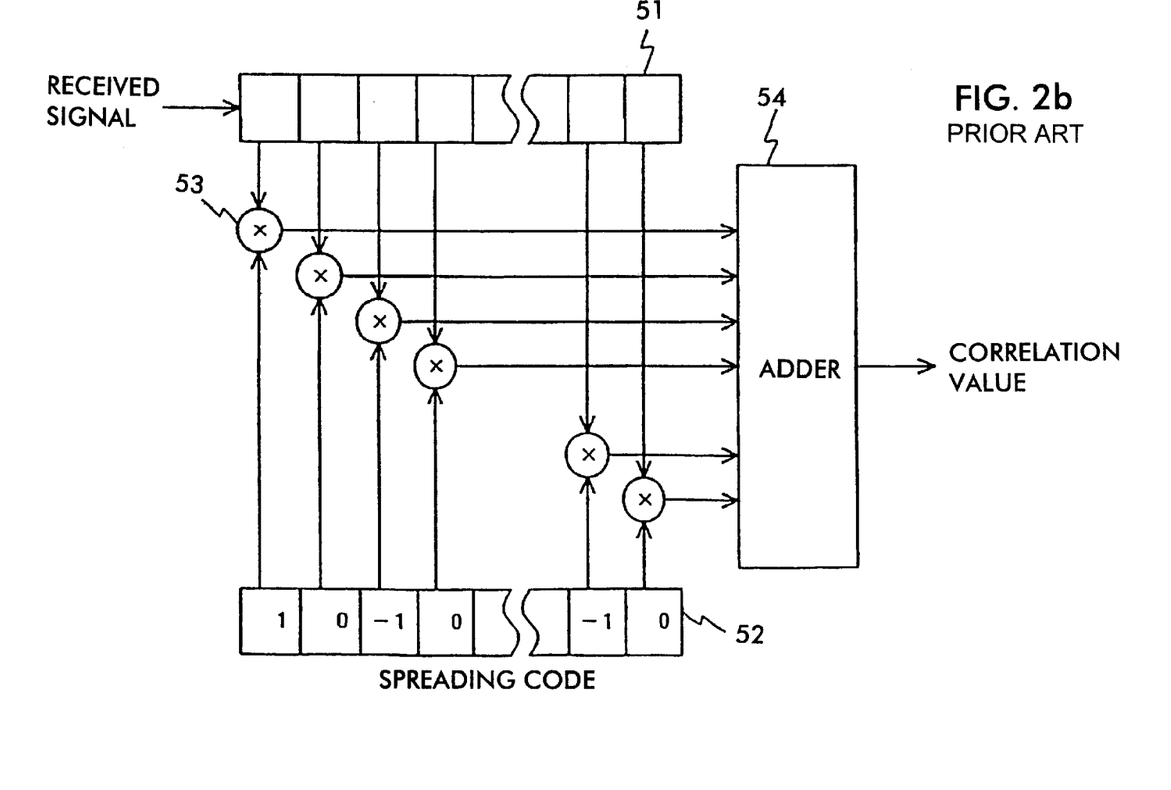
FIG. 2b is an explanatory view of the matched filter shown in FIG. 1.

Referring now to FIG. 2b, matched filter 42 comprises received signal shift register 51, spreading code register 52, multipliers 53, and adder 54.

Received signal shift register 51 receives and shifts the received signal. Spreading code register 52 sets a spreading code sequence of the same bit length as this received signal shift register 51. Multipliers 53 multiply the values of received signal shift register 51 and spreading code register 52. Adder 54 adds the output signals of multipliers 53.

As shown in FIG. 2a, the received signal sequence is constituted by a known portion (pilot portion) and a data portion that is not know, and is sampled at, for example, twice the chip period of the spreading code, and through A/D conversion, becomes a digital value between −1.0–+1.0. In this case, received signal shift register 51 shifts the received signal each ½ chip period in accordance with the sampling period of the received signal.

Figure 3:
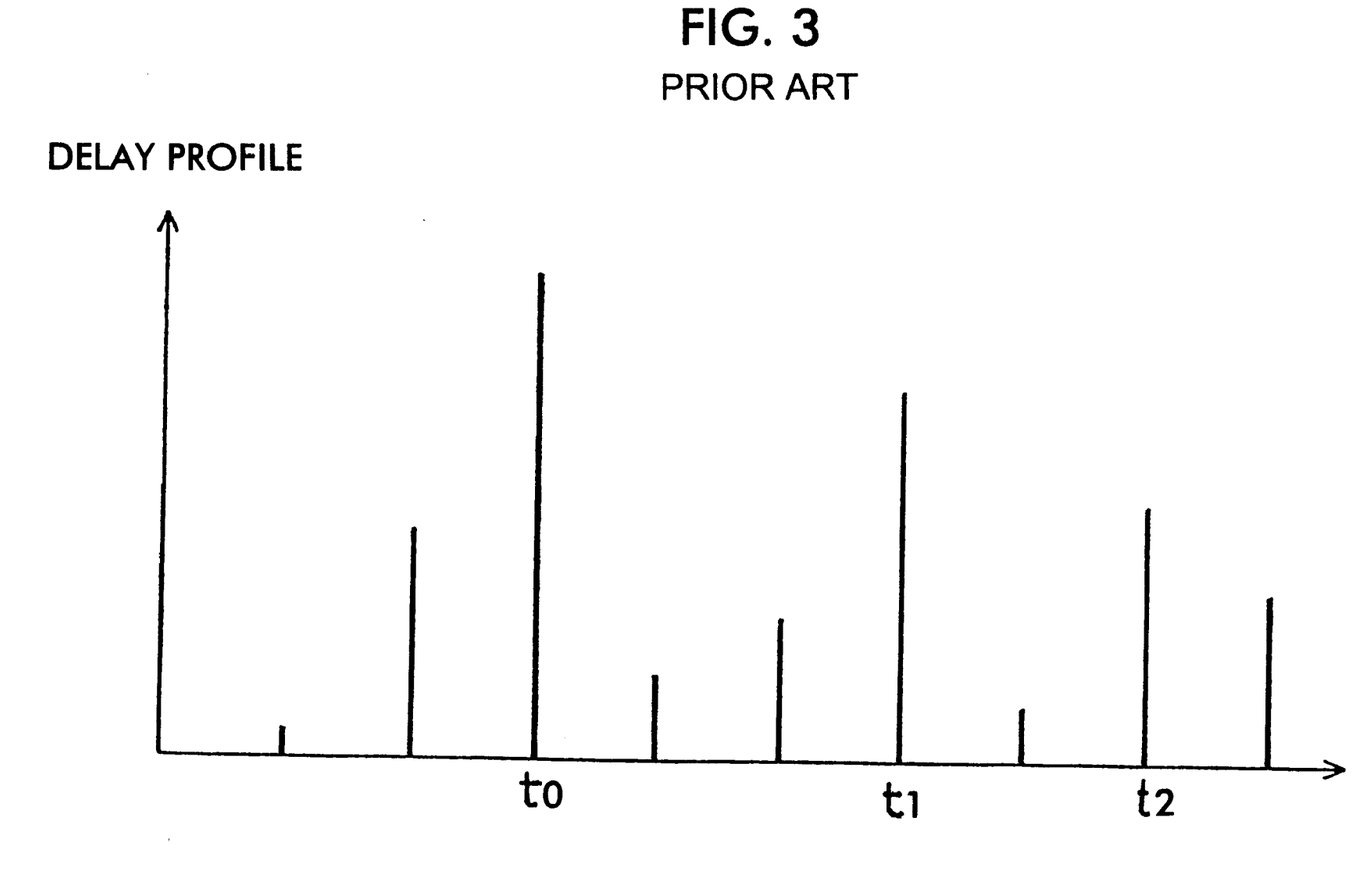
FIG. 3 is a view showing a delay profile in the prior-art example.

The output signals of each stage of this received signal shift register 51 and each bit of the spreading code sequence set by spreading code register 52 are multiplied by multipliers 53 for each shift, and the results of multiplication are added in adder 54 to produce the correlation values. If the size of these correlation values is arranged on the time axis as shown in FIG. 3, a delay profile is obtained in which the correlation values increase at $\tau 0$, $\tau 1$, and $\tau 2$.

The delay profile varies with fading or movement of a mobile terminal and has a plurality of maximum values, and the timing of which is extracted by timing detector 44. If the delay profile is represented as shown in FIG. 3, the correlation values in the delay profile are selected in descending order of size and the timing at which each of these correlation values was obtained is reported to despreaders 45–47 by means of respectively different timing signals.

Japanese Patent Laid-open No. 178386/98 and Japanese Patent Laid-open No. 336072/98 each disclose an example of the aforementioned CDMA receiver.

In a CDMA receiver of the aforementioned prior art, the spreading code and received data must be reliably and accurately synchronized, and it is well known that reception characteristics deteriorate drastically with a variance in synchronization of just ¼ chip. The deterioration is particularly noticeable in the case of a low spreading rate, such as in high-speed data transfer.

SUMMARY OF THE INVENTION

In view of the foregoing problems, it is an object of the present invention to provide a direct sequence CDMA receiver that can accurately acquire synchronization of despreading timing without increasing the sampling rate of the A/D conversion of received data, and to thereby improve reception characteristics.

The direct sequence CDMA receiver according to the present invention comprises an analog/digital conversion means, a matched filter, and a delay profile production means.

The analog/digital conversion means samples, at twice the chip rate, a baseband signal obtained by demodulating a signal received by way of an antenna. The matched filter acquires correlation values of the received data sampled by the analog/digital conversion means and a spreading code while time-shifting said received data. The delay profile production means interpolates correlation values found by the matched filter, and finds the delay profiles from the interpolated correlation values. That is, when establishing synchronization on the receiving side, correlation values are found between a spreading code composed of 1/−1 data and then received data, and delay profile is produced using the correlation values of the sampling period. The timings of peaks in the correlation values in the delay profile are then obtained to realize synchronization between the received data and the spreading code. The accuracy of synchronization is therefore dependent on the sampling interval of the received data.

In contrast, the direct sequence CDMA receiver according to the present invention inputs a signal received by an antenna and converted to a baseband signal, and samples the input at twice the chip rate in an A/D converter. Thereafter, correlation values with the received data are then found by means of the matched filter using the 1/−1 spreading code and are interpolated by means of, for example, a filter in the delay profile production means having an interpolation function. These interpolated data are then used to provide delay profiles as a continuous characteristic. As a result, the timing of peaks in the delay profiles can also be obtained with higher accuracy in a timing detector irrespective of a sampling period.

In addition, the correlation values in a delay profile are selected in descending order of size, the timings at which these correlation values were obtained are extracted, and respectively different timing signals are supplied to despreader. The despreaders are not limited to three in number, and may one or more.

In the despreaders, the spreading code is interpolated to synchronize with these timing signals, and the received data are despread using the interpolated values. The despread signals are RAKE/diversity mixed in a mixer to obtain data.

Synchronization of despread timing can thus be accurately achieved without increasing the A/D conversion sampling rate of the received data, thereby improving reception characteristics.

The above and other objects, features, and advantages of the present invention will become apparent from the following description with reference to the accompanying drawings which illustrate examples of the present invention.

DETAILED DESCRIPTION OF THE PREFERRED EMBODIMENTS

First Embodiment

Figure 4:
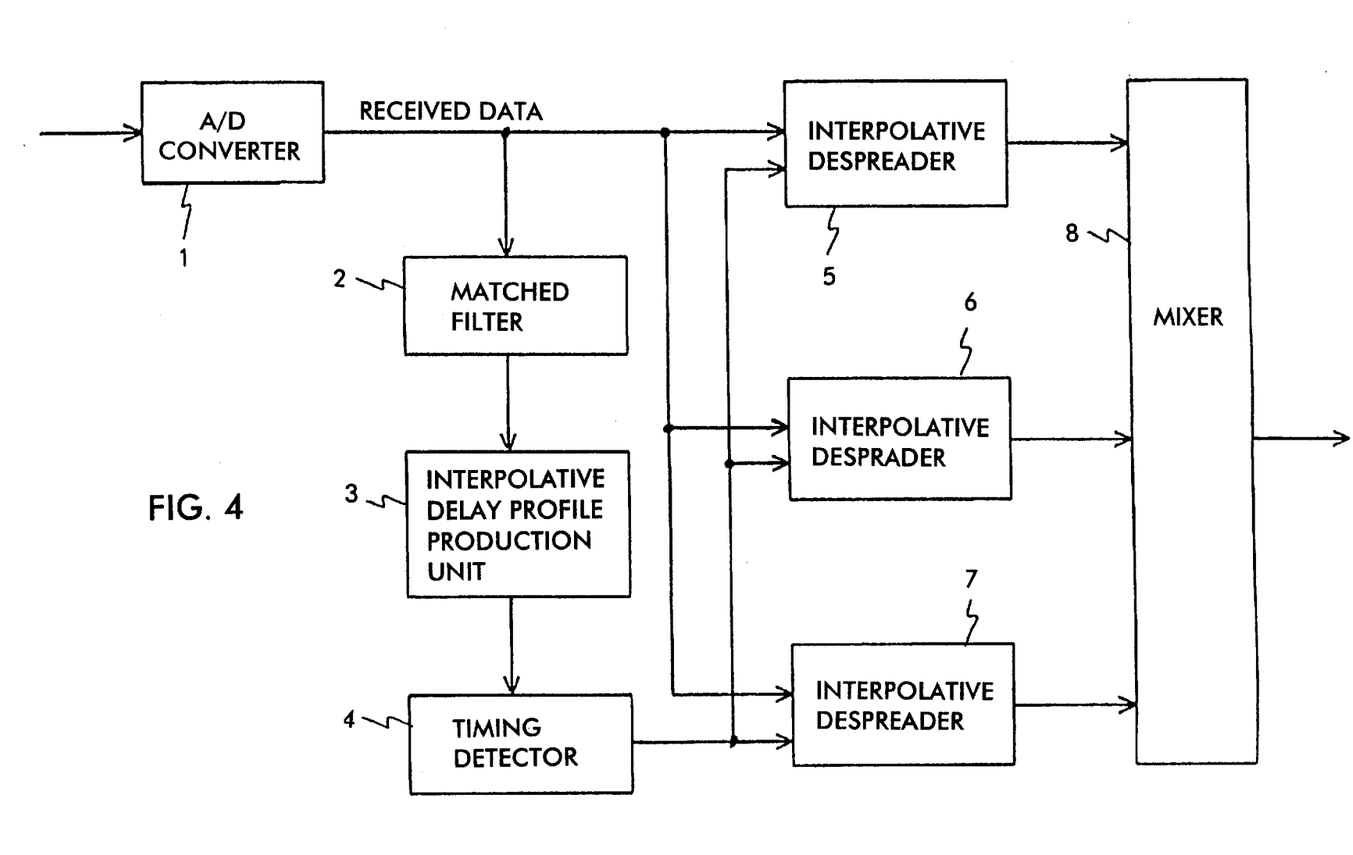
FIG. 4 is a block diagram showing the configuration of a direct sequence CDMA receiver according to the first embodiment of the present invention.

Referring now to the FIG. 4, there is shown a direct sequence CDMA receiver (hereinbelow referred to as "receiver") according to the first embodiment comprises A/D (analog/digital) converter 1, matched filter 2, interpolative delay profile production unit 3, timing detector 4, interpolative despreaders 5–7, and mixer 8.

A/D converter 1 samples a baseband signal obtained by demodulating a signal received by an antenna (not shown) at twice the chip rate. Matched filter 2 finds correlation values between a spreading code and received data sampled in A/D converter 1. Interpolative delay profile production unit 3 interpolates the correlation values found by matched filter 2 at, for example, 1/16 chip interval, which is equivalent to eight times the sampling rate.

Interpolative delay profile production unit 3 finds delay profiles based on the interpolated correlation values. Timing detector 4 selects a predetermined number of values in descending order of size from the peak value among the correlation values of these delay profiles, and generates timing signals based on the timings of each of the selected values. The receiver then despreads the received data at interpolative despreaders 5–7 using a spreading code that is synchronized with these timing signals, and obtains data through RAKE/diversity mixing at mixer 8.

Interpolation performed by interpolative delay profile production unit 3 may only apply to the higher portions of the correlation values, and the time intervals after interpolation may be appropriately shortened or lengthened. The present embodiment has three interpolative despreaders, but this number may be increased or decreased according to the use environment.

Figure 5A:
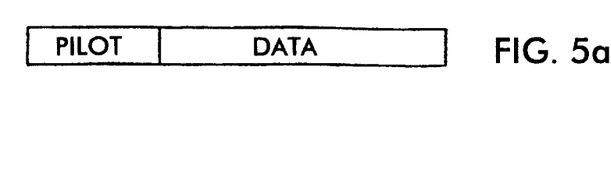
FIG. 5a shows the composition of a received signal for use in the receiver according to the first embodiment of the present invention.
Figure 5B:
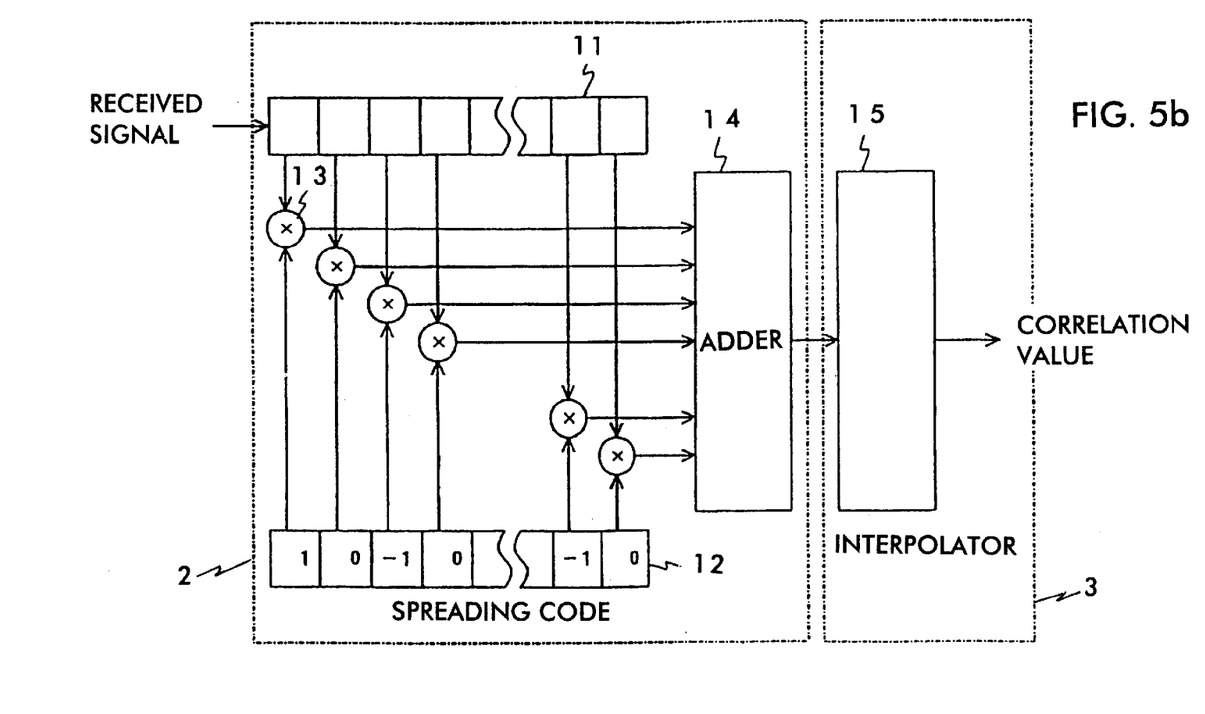
FIG. 5b shows the construction of a matched filter and delay profile production unit with interpolation function shown in FIG. 4.

Referring now to FIG. 5b, matched filter 2 is made up of received signal shift register 11, spreading code register 12, multipliers 13, and adder 14.

Received signal shift register 11 shifts received signals received by matched filter 2. Spreading code register 12 sets a spreading code sequence of the same bit length as received signal shift register 11. Multipliers 13 multiply the values of received signal shift register 11 and spreading code register 12 together, Adder 14 adds together the output signals of multipliers 13.

Interpolative delay profile production unit 3 includes an interpolator 15 that interpolates the output signals of adder 14. Although not shown in the figure, interpolative delay profile production unit 3 includes a delay profile production unit that produces delay profiles based on the output of interpolator 15.

The received signals are composed of a known transmission data string and a data portion that is unknown. As shown in FIG. 5a, in an example of one possible composition, pilot symbols, which are a number of symbols in which the transmission data sequence is already known, come at the head, and these pilot symbols are followed by data symbols.

Figure 7:
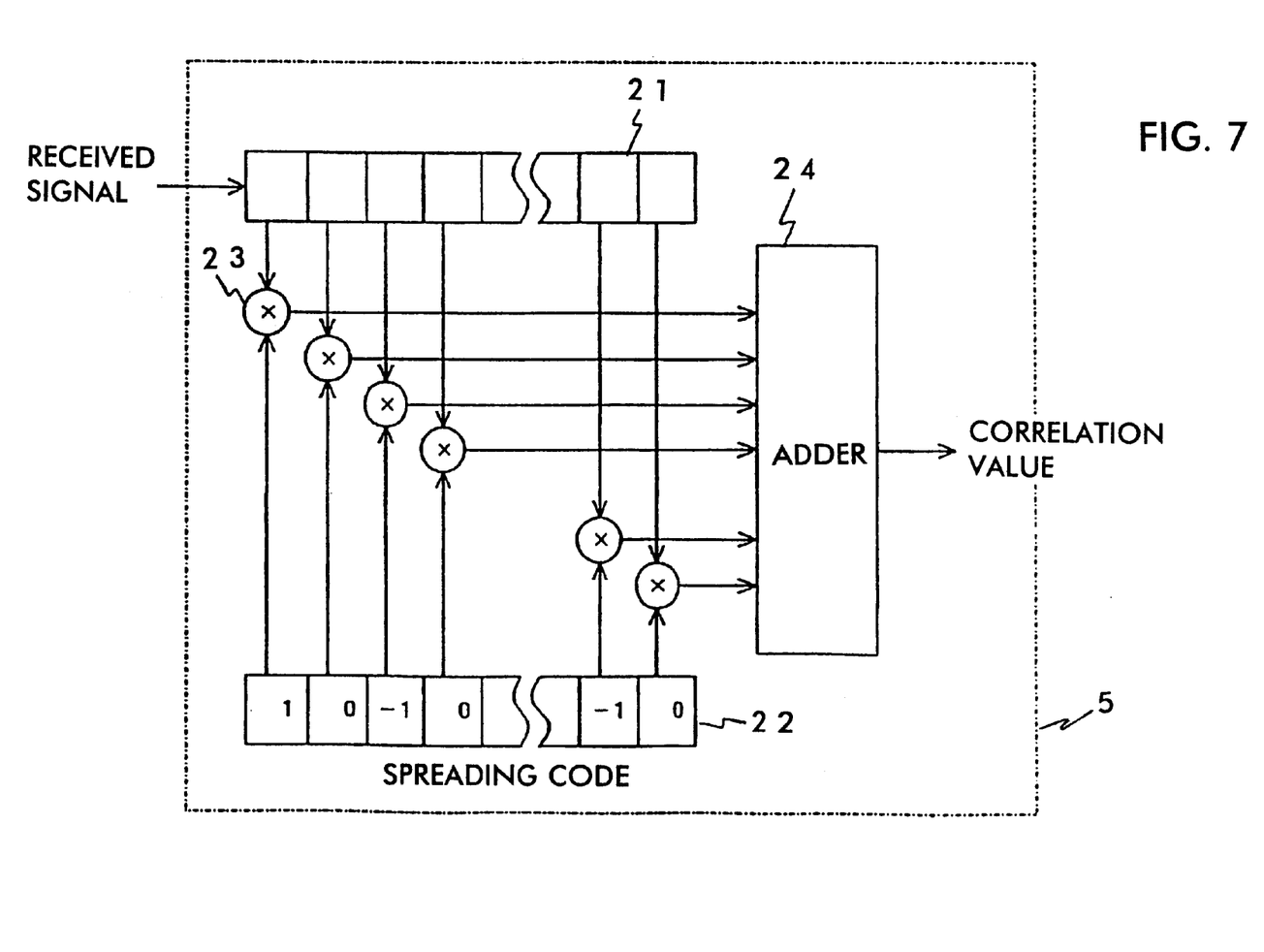
FIG. 7 is a view showing the construction of a despreader with interpolation function in FIG. 4.

Referring now to FIG. 7, interpolative despreader 5 comprises received signal shift register 21, spreading code register 22, multipliers 23, and adder 24.

Received signal shift register 21 shifts received signals received by interpolative despreader 5. Spreading code register 22 sets a spreading code sequence of the same bit length as received signal shift register 21. Multipliers 23 multiply the values of received signal shift register 21 and spreading code register 22 together. Adder 24 adds together the output signals of multipliers 23.

Although not shown in the figures, interpolative despreaders 6 and 7 have the same construction as interpolative despreader 5.

Received signals are sampled at twice the chip period of the spreading code and then undergo A/D conversion to become digital values between −1.0−+1.0. Received signal shift register 21 is, for example, twice the length of the spread rate, and shifts received signals one at a time each ½ chip period in accordance with the sampling period of the received signals.

The output signals of each stage of this received signal shift register 11 and each bit of the spreading code sequence that is set by spreading code register 12 are multiplied at multipliers 13 for each shift, and the results of multiplication are added together at adder 14 to obtain correlation values. These correlation values are interpolated at interpolator 15 using, for example, a FIR (Finite Impulse Response) low-pass interpolation filter.

Specifically, the correlation values are extended to a suitable length by inserting zeros between the original correlation value data values without altering the original data. A symmetrical FIR filter is designed such that the mean square error between the interpolated points and ideal points is minimized. The filter is applied to the correlation value data in which zeros have been inserted to produce interpolated values.

Figure 6:
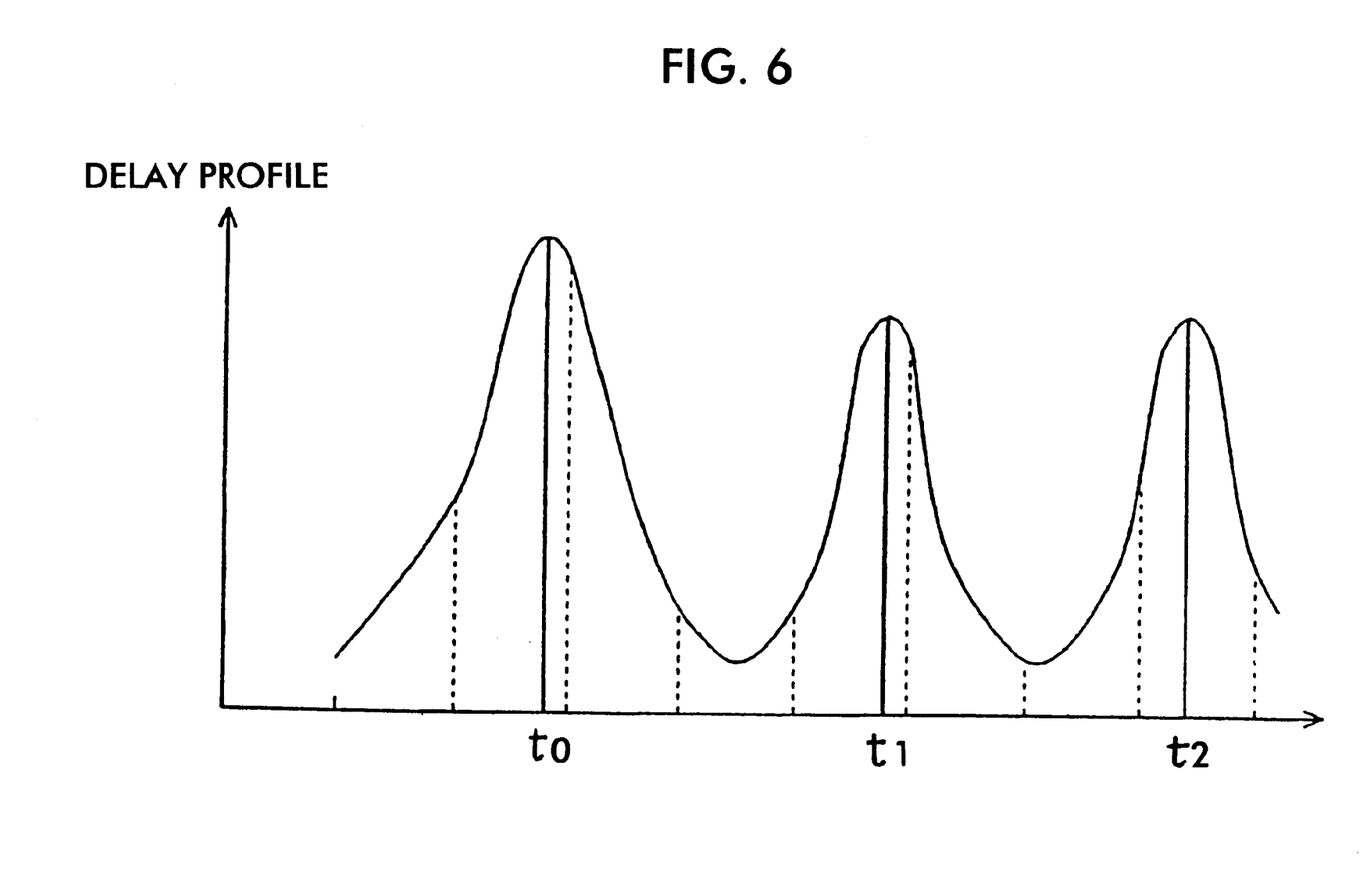
FIG. 6 is a view showing a delay profile in the first embodiment of the present invention.

By using these interpolated correlation values, a delay profile is obtained having peaks in the correlation values at t0, t1, t2, as shown in FIG. 6. Moreover, the accuracy of the delay profile can be improved by demodulating the despreading pilot symbols by the transmission data sequence of the pilot symbols and adding. In a case in which an known transmission sequence is received continuously and periodically, the accuracy of the delay profile can be further improved by carrying out weighted averaging using another known portion.

Timing detector 4 selects a predetermined number of values in descending order of the correlation values of this delay profile and outputs timing signals based on each of the selected timings to a respective one of interpolative despreaders 5–7. If the delay profile is represented as shown in FIG. 6, timing detector 4 extracts the timings t0, t1 and t2.

Interpolative despreaders 5–7 resample the received data based on these timing signals and perform despreading of the received data using a spreading code that is synchronized with the resampled received data. Mixer 8 subjects the received data that have been despread by interpolative despreaders 5–7 to RAKE/diversity mixing to obtain data.

With the foregoing procedures, synchronization of despreading timing can be achieved accurately without increasing the sampling rate when performing A/D conversion of received data, thereby improving reception characteristics can be improved.

Second Embodiment

A direct sequence CDMA receiver according to the second embodiment of the present invention will be next described. In the first embodiment of the present invention, the timing of a sample was adjusted by resampling received data. However, received data need not be resampled if the value of a spreading code shift register is changed to a real number value (a complex number if spread is, for example, QPSK (Quadrature Phase Shift Keying) instead of 1/0/−1, as shown in FIG. 8.

Figure 8:
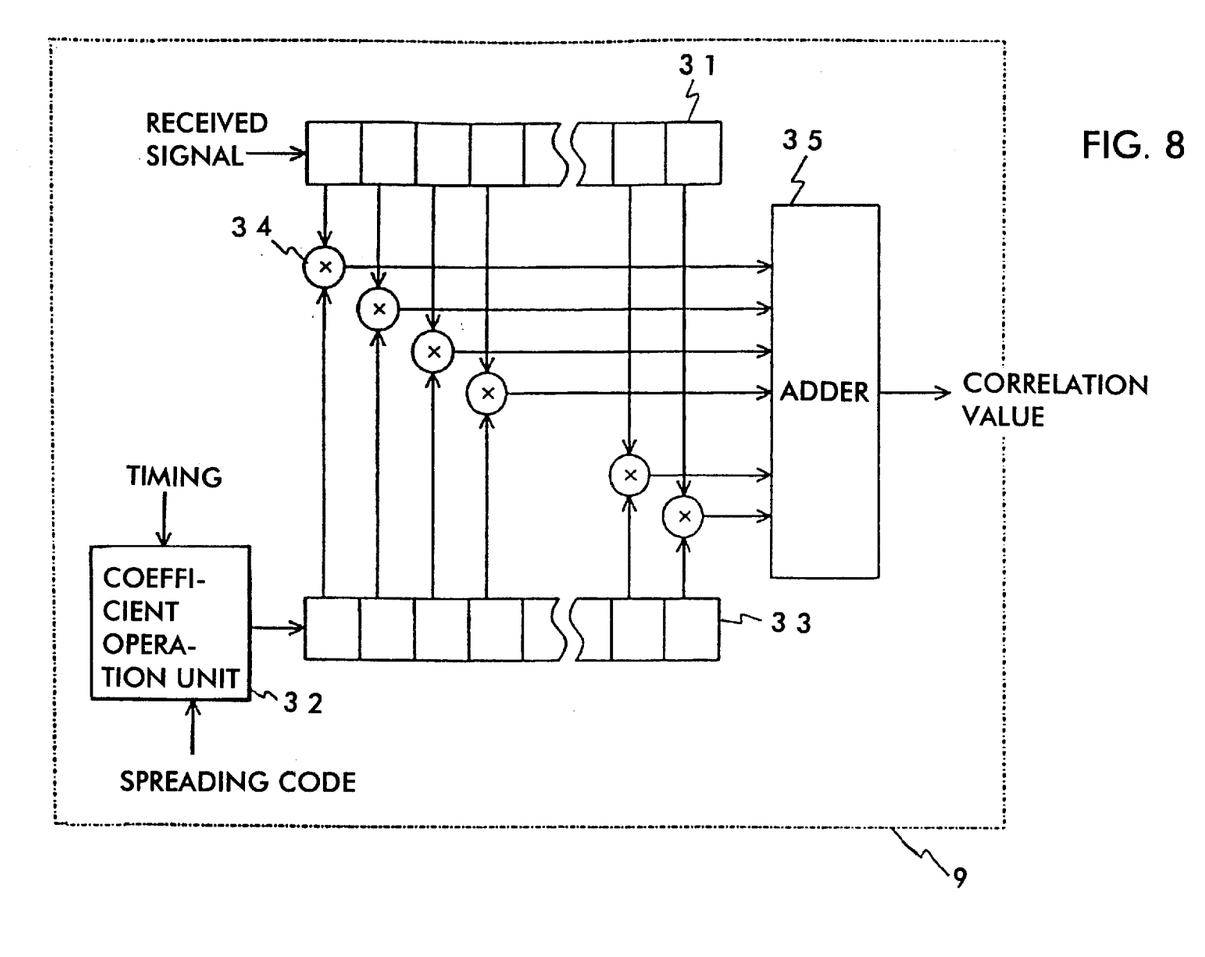
FIG. 8 is an explanatory view of a matched filter and interpolation of interpolation values in the second embodiment of the present invention.

Referring now to FIG. 8, interpolative despreader 9 according to the second embodiment of the present invention comprises received signal shift register 31, coefficient operation unit 32, filter coefficient register 33 having the same register length as received signal shift register 31, multipliers 34, and adder 35.

Received signal shift register 31 receives and shifts received signals. Coefficient operation unit 32 operates the coefficient of a filter based on the spreading code and timing signals. Multipliers 34 multiply the values of received signal shift register 31 and filter coefficient register 33, and adder 35 adds the output signals of multipliers 34. With the exception of the construction of interpolative despreader 9, the receiver according to the second embodiment of the present invention has the same construction as the receiver according to the first embodiment of the present invention shown in FIG. 4, and the operation is also the same as that of the first embodiment of the present invention.

In the above-described first embodiment of the present invention, if the length of the filter during resampling is 4 and the filter coefficient at that time is f(1), f(2), f(3), and f(4), the resample points R(n) are:

R(n)=f(1)·r(n−3)+f(2)·r(n−2)+f(3)·r(n−1)+f(4)·r(n)

and the correlation of the spreading code s(n) is:

s(n)·R(n)=s(n)·f(1)·r(n−3)+s(n)·f(2)·r(n−2)+s(n)·f(3)·r(n−1)+s(n)·f(4)·r(n)

To find correlation value C(N), the spread rate portion of s(n)·R(n) should be added, and if the spread rate is 4, it can be seen that the value of filter coefficient register 33 should be set such that:

C(N)=s(n−3)·R(n−3)+s(n−2)·R(n−2)+s(n−1)·R(n−1)+s(n)·R(n)=s(n−3)·f(1)·r(n−6)+s(n−3)·f(2)·r(n−5)+s(n−3)·f(3)·r(n−4)+s(n−3)·f(4)·r(n−3)+s(n−2)·f(1)·r(n−5)+s(n−2)·f(2)·r(n−4)+s(n−2)·f(3)·r(n−3)+s(n−2)·f(4)·r(n−2)+s(n−1)·f(1)·r(n−4)+s(n−1)·f(2)·r(n−3)+s(n−1)·f(3)·r(n−2)+s(n−1)·f(4)·r(n−1)+s(n)·f(1)·r(n−3)+s(n)·f(2)·r(n−2)+s(n)·f(3)·r(n−1)+s(n)·f(4)·r(n)=[s(n−3)·f(1)]·r(n−6)+[s(n−3)·f(2)+s(n−1)·f(1)]·r(n−5)+[s(n−3)·f(3)+s(n−2)·f(2)+s(n−1)·f(1)]·r(n−4)+[s(n−3)·f(4)+s(n−2)·f(3)+s(n−1)·f(2)+s(n)·f(1)]·r(n−3)+[s(n−2)·f(4)+s(n−1)·f(3)+s(n)·f(2)]·r(n−2)+[s(n−1)·f(4)+s(n)·f(3)]·r(n−1)+[s(n)·f(4)]·r(n)

and then:

S(n−6)=s(n−3)·f(1)

S(n−5)=s(n−3)·f(2)+s(n−2)·f(1)

S(n−4)=s(n−3)·f(3)+s(n−2)·f(2)+s(n−1)·f(1)

S(n−3)=s(n−3)·f(4)+s(n−2)·f(3)+S(n−1)·f(2)+s(n)·f(1)

S(n−2)=s(n−2)·f(4)+s(n−1)·f(3)+s(n)·f(2)

S(n−1)=s(n−1)·f(4)+s(n)·f(3)

S(n)=s(n)·f(4)

This operation merely involves cutting the spreading code into symbol units and then employing the filter used during resampling in the first embodiment of the present invention.

Received signals are thus applied to received signal shift register 31, coefficient operation unit 32 operates the coefficient of the filter based on the spreading code and timing signals and sets this coefficient in filter coefficient register 33, and multipliers 34 multiply the values of received signal shift register 31 and filter coefficient register 33. Adder 35 then adds the output signals of multipliers 34 to obtain a correlation value for one symbol.

To obtain the next correlation value, a 1-symbol portion of received data is applied to received signal shift register 31, coefficient operation unit 32 operates the next filter coefficient based on the spreading code and timing signals and sets this coefficient in filter coefficient register 33, and multipliers 34 multiply the values of received signal shift register 31 and filter coefficient register 33. Adder 35 then adds the output signals of multipliers 34 to obtain the next correlation value for one symbol. Following detection, the thus-obtained symbol period of correlation values undergo RAKE/diversity mixing to obtain the transmission sequence.

The process for finding a filter coefficient is added in the present embodiment, and the length of received signal shift register 31 and filter coefficient register 33 is increased by just −1 over the length of the filter used during resampling in the first embodiment of the present invention. Nevertheless, since these processes are the symbol period, the processing load is lightened by the lack of the resampling process of the first embodiment of the present invention, which is carried out chip by chip.

In the case of a high spread rate, the relative increase in the length of received signal shift register 31 and filter coefficient register 33 is slight, and an improvement in reception characteristics can be achieved even though the process of despreading (multiplication and addition) is the same as in the prior art.

While preferred embodiments of the present invention have been described using specific terms, such description is for illustrative purposes only, and it is to be understood that changes and variations may be made without departing from the spirit or scope of the following claims.

What is claimed is:

1. A direct sequence CDMA receiver for performing despreading of received data based on a delay profile produced from said received data, comprising:

analog/digital conversion means for sampling at twice the chip rate a baseband signal obtained by demodulating a signal received from an antenna;

a matched filter for finding correlation values between received data that has been sampled by said analog/digital conversion means and a spreading code, while shifting said received data in time;

a delay profile production means for interpolating correlation values found by said matched filter and finding said delay profile from the interpolated correlation values;

timing detection means for selecting, in descending order of size, delay profiles found by said delay profile production means to extract each timing;

despread processing means for interpolating a spreading code to synchronize with timing signals detected by said timing detection means and using these interpolated values to carry out despreading of received data; and mixing means for subjecting signals that have undergone despreading by said despreader to RAKE/diversity mixing to obtain data.

2. A receiving according to claim 1, wherein said despread processing means includes means for sampling received data based on timing signals detected by said timing detection means and using a spreading code that has been synchronized with resampled received data to subject said received data to despreading.

3. A receiver according to claim 1, includes one or more of said despreading means.

4. A direct sequence CDMA receiver for performing despreading of received data based on a delay profile produced from said received data, comprising:

analog/digital conversion means for sampling at twice the chip rate a baseband signal obtained by demodulating a signal received from an antenna;

a matched filter for finding correlation values between received data that has been sampled by said analog/digital conversion means and a spreading code, while shifting said received data in time; and a delay profile production means for interpolating correlation values found by said matched filter and finding said delay profile from the interpolated correlation values, wherein said despreading includes coefficient operation means for operating a filter coefficient from timing signals detected by timing detection means and said spreading code, and a means for despreading based on said filter coefficient.

5. A direct sequence CDMA receiver for performing despreading of received data based on a delay profile produced from said received data, comprising: analog/digital conversion means for sampling at twice the chip rate a baseband signal obtained by demodulating a signal received from an antenna;

a matched filter for finding correlation values between received data that has been sampled by said analog/digital conversion means and a spreading code, while shifting said received data in time;

a delay profile production means for interpolating correlation values found by said matched filter and finding said delay profile from the interpolated correlation values, wherein said delay profile production means produces interpolated correlation values by using a filter in which zeros are inserted into interpolated correlation values;

timing detection means for selecting, in descending order of size, delay profiles found by said delay profile production means to extract such timings;

despreading means for interpolating a spreading code to synchronize with timing signals detected by said timing detection means, and performing despreading of received data using the interpolated values; and mixing means for obtaining data by carrying out RAKE/diversity mixing of signals that have undergone despreading by said despreading means.

6. A receiver according to claim 5, wherein said despreading means includes means for resampling received data based on timing signals detected by said timing detection means, and for carrying out despreading of said received data by using a spreading code that is synchronized with the resampled received data.

7. A receiver according to claim 6 includes one or more of said despreading means.

8. A direct sequence CDMA receiver for performing despreading of received data based on a delay profile produced from said received data, comprising:

analog/digital conversion means for sampling at twice the chip rate a baseband signal obtained by demodulating a signal received from an antenna;

a matched filter for finding correlation values between received data that has been sampled by said analog/digital conversion means and a spreading code, while shifting said received data in time; and a delay profile production means for interpolating correlation values found by said matched filter and finding said delay profile from the interpolated correlation values, wherein said delay profile production means produces interpolated correlation values by using a filter in which zeros are inserted into interpolated correlation values, wherein despreading means includes coefficient operation means for operating a filter coefficient from timing signals detected by timing detection means and said spreading code, and a means for despreading based on said filter coefficient.

* * * * *